US007010721B2

(12) United States Patent
Vincent

(10) Patent No.: US 7,010,721 B2
(45) Date of Patent: Mar. 7, 2006

(54) FILE SYSTEM JOURNAL MANAGEMENT

(75) Inventor: Pradeep Vincent, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 10/673,747

(22) Filed: Sep. 29, 2003

(65) Prior Publication Data

US 2005/0071593 A1     Mar. 31, 2005

(51) Int. Cl.
G06F 12/12     (2006.01)
G06F 12/16     (2006.01)
G06F 11/34     (2006.01)

(52) U.S. Cl. ............................. 714/20; 714/18; 714/5; 714/6; 711/156; 711/159; 711/162

(58) Field of Classification Search ................... 714/20
See application file for complete search history.

(56) References Cited

U.S. PATENT DOCUMENTS

| | | |
|---|---|---|
| 4,507,751 A | 3/1985 | Gawlick et al. |
| 4,916,605 A | 4/1990 | Beardsley et al. |
| 5,386,554 A | 1/1995 | Nozaki |
| 5,437,012 A | 7/1995 | Mahajan |
| 5,727,206 A | 3/1998 | Fish et al. |
| 5,850,522 A | 12/1998 | Wlaschin |
| 5,870,757 A | 2/1999 | Fuller |
| 6,004,037 A * | 12/1999 | Harris et al. ................ 384/206 |
| 6,021,414 A | 2/2000 | Fuller |
| 6,725,392 B1 * | 4/2004 | Frey et al. ...................... 714/6 |
| 6,732,124 B1 * | 5/2004 | Koseki et al. .............. 707/202 |
| 6,795,895 B1 * | 9/2004 | Merkey et al. ............. 711/114 |
| 2002/0152195 A1 | 10/2002 | Bills et al. |

FOREIGN PATENT DOCUMENTS

JP      06-067959      3/1994

* cited by examiner

*Primary Examiner*—B. James Peikari
(74) *Attorney, Agent, or Firm*—Timothy N. Ellis

(57) ABSTRACT

A method for data journaling includes writing data into at least one block in a journal storage area, and marking each written block as dirty. If the number of blocks in the journal storage area marked as dirty is greater than the number of blocks in a corresponding data storage area that have been used and whose corresponding blocks in the journal storage area are not marked as dirty, then those used blocks are copied to the corresponding blocks in the journal storage area, and a message is transmitted instructing a meta-data server to swap the data storage area and the journal storage area. If this condition is not so, the blocks in the journal storage area marked as dirty are copied to corresponding blocks in the data storage area, and a message is transmitted instructing the meta-data server to commit the data stored in the journal storage area.

23 Claims, 6 Drawing Sheets

Transfer Block 5 from Data Extent to Journal
Extent (Overhead = 1 Block Write)

Transfer Block 5 from Data Extent to Journal
Extent (Overhead = 1 Block Write)

Swap Data Extent and Journal Extent

FILE SYSTEM JOURNAL MANAGEMENT

BACKGROUND

1. Technical Field

The present invention relates to journaling in a file system in a computing system. More particularly, the invention concerns a method for data journaling with improved write performance.

2. Description of Related Art

Important data is often stored in computer systems. Data can be lost due to problems such as system crashes, hardware failures, and abnormal computing system halts. Journaled file systems can be used to maintain data integrity when these types of problems occur. Journaled file systems maintain file system integrity by recording information regarding updates to directories, bitmaps, and/or data, in a log, also called a journal, before the updates are written to a storage device such as a hard disk. In event of a system crash or other problem, the information in the journal can be used to restore the file system to a consistent state. Full-journaling filesystems additionally perform data journaling, in which data updates are also stored in the journal, to ensure that no committed data is lost.

In most filesystems that implement data journaling, for example ext3, write performance is degraded by a factor of two. The write performance is degraded because every write is first written to the log, and is subsequently written to the original target storage location. Consequently, the performance of existing data journaling filesystems is not adequate for many applications.

SUMMARY

One aspect of the invention is a method for data journaling. An example of the method includes the operations of writing data into at least one block in a journal storage area, and marking as dirty, each block in the journal storage area that has been written into. The method also includes determining if the number of blocks in the journal storage area that have been marked as dirty is greater than the number of blocks in a corresponding data storage area that have been used and whose corresponding blocks in the journal storage area are not marked as dirty. If this condition is so, the method further includes copying the used blocks in the data storage area whose corresponding blocks in the journal storage area are not marked as dirty, to the corresponding blocks in the journal storage area, and, transmitting to a meta-data server, a message instructing the meta-data server to swap the data storage area and the journal storage area. If the condition is not so, then the method further includes copying the blocks in the journal storage area that have been marked as dirty to corresponding blocks in the data storage area, and transmitting to the meta-data server, a message instructing the meta-data server to commit the data that has been stored in the journal storage area.

Other aspects of the invention are described in the sections below, and include, for example, a computing system, and a signal bearing medium tangibly embodying a program of machine-readable instructions executable by a digital processing apparatus to perform a method for data journaling.

The invention provides a number of advantages. For example, the invention advantageously provides for data journaling with improved write performance. The invention also provides a number of other advantages and benefits, which should be apparent from the following description.

DETAILED DESCRIPTION

Figure 1:
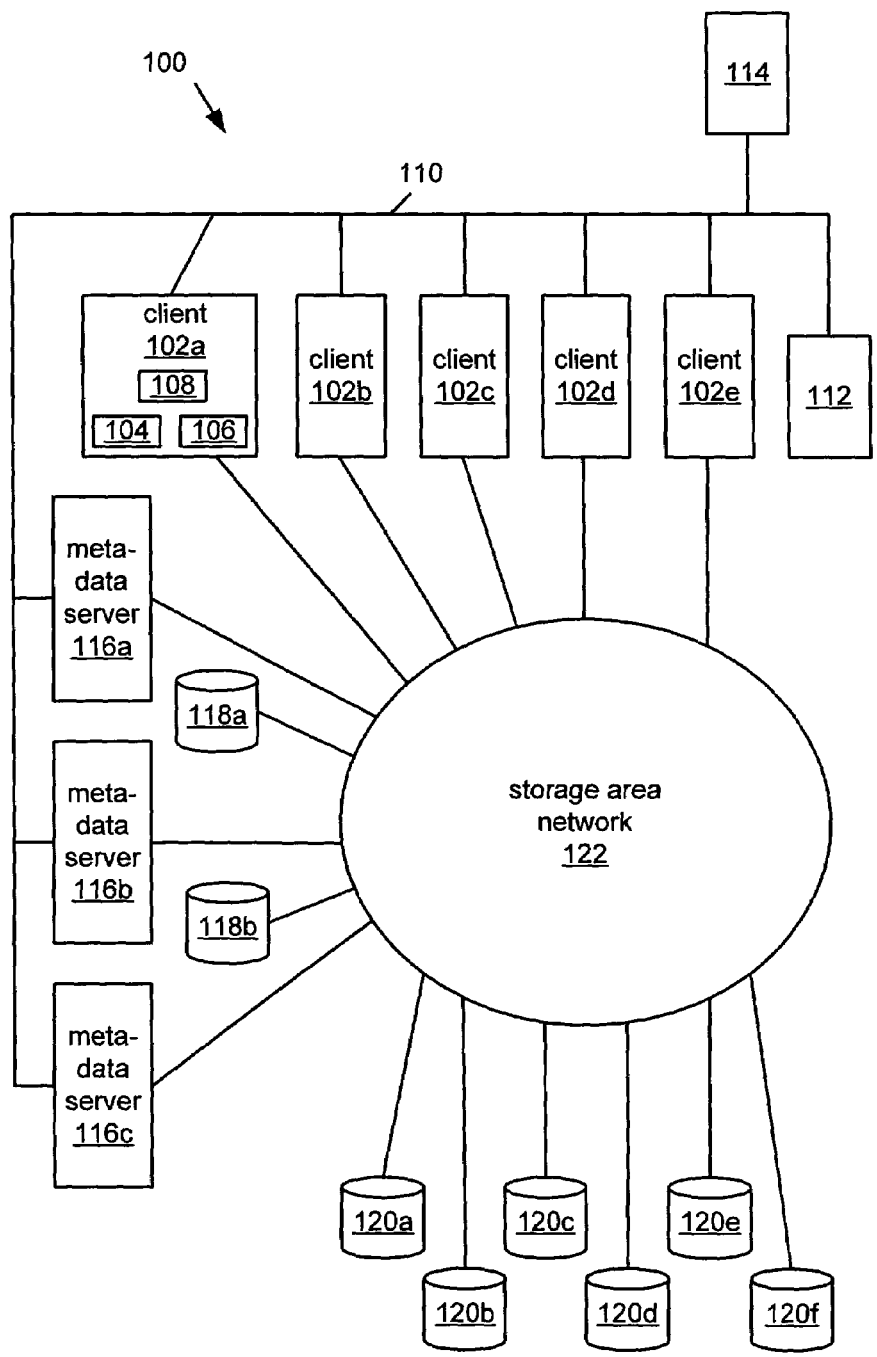
FIG. 1 is a block diagram of the hardware components and interconnections of a computer network in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a computing system that can be used for data journaling. As an example, the computing system may be embodied by all, or portions of, the computer network 100 shown in FIG. 1. As an example, the computer network 100 may implement the architecture for the Storage Tank™ file system and storage management system, which is available from International Business Machines Corporation, and the architecture for a storage area network (SAN).

The computer network 100 includes one or more client computers 102a–e. The clients 102a–e may be the same or heterogeneous, and may run the same, or different operating systems, such as, for example, Windows 2000, AIX, Solaris™, Linux, or HP-UX™. Each client 102a–e may be implemented on any suitable computing device, for example a personal computer, a workstation, a mainframe computer, or a supercomputer. In one example, a client 102a–e may be a personal computer running an Intel processor.

As shown for the client 102a, each client 102a–e may have a memory that may include a storage 104 (for example RAM), and/or a non-volatile storage 106 (which need not be included). Each client 102a–e also has a processor 108 (which may be called a processing device), and in some examples could have more than one processor. As an example, the memory may be used to store data and application programs and/or other programming instructions executed by the processor 108. The non-volatile storage 106 could be, for example, a hard disk drive, a drive for reading and writing from optical or magneto-optical media, a tape drive, non-volatile RAM (NVRAM), or any other suitable type of storage. The non-volatile storage 106 may, in some examples, be referred to as local storage/NVRAM. In some examples the storage 104 or the non-volatile storage 106 could be eliminated, or the storage 104 and/or the non-volatile storage 106 could be provided on the processor 108, or alternatively, external from the client 102a–e.

In the computer network 100, the clients 102a–e may share data and have centrally managed storage. Each client computer 102a–e may run a program called a Storage Tank client (not shown). The Storage Tank client is inserted at a virtual file system (VFS) interface on UNIX systems, and as an installable file system (IFS) on Windows systems. The Storage Tank client may include a file system interface, a client state manager, and operating system services. The client state manager may function as an intermediary between a client computer file system and meta-data server computers (discussed below). As an example, the Storage Tank client may direct requests for meta-data and locks to server computers, and may send requests for data to data storage devices.

The client computers 102a–e may be connected over a network 110, which could be an IP network, and which could be implemented with Ethernet. An administrative client 112, and one or more external clients 114, may also be connected to the network 110.

The computer network 100 also includes at least one meta-data server computer, such as the meta-data server computers 116a–c, which may be configured to operate as a cluster. Each meta-data server computer 116a–c may be implemented with a personal computer (having for example, an Intel processor running Linux), a computer workstation, a mainframe computer, a supercomputer (for example an IBM SP2 running the AIX operating system), or any other suitable computing device. In one example, each meta-data server 116a–c could be an IBM xSeries server. Alternatively each meta-data server 116a–c could be an IBM zSeries Parallel Sysplex server, such as a zSeries 900, running the z Operating System (z/OS). In another example, each meta-data server 116a–c could be an IBM S/390 server running OS/390. It is not necessary for each meta-data server 116a–c to be implemented with the same type of computing device. The meta-data servers 116a–c may be coupled to each other, and to the client computers 102a–e, the administrative client 112, and the external client(s) 114, over a network, which as an example, may be the network 110. Alternatively, the servers 116a–c may be interconnected on their own high speed network. As an example, the meta-data server computers 116a–c manage file system meta-data, such as for example, file creation time, file security information, and file location information.

The computer network 100 may also include a meta-data store that includes one or more meta-data storage devices 118a–b, and a data store, that may include a plurality of data storage devices 120a–f (which may also be called remote storage targets). The meta-data storage devices 118a–b and the data storage devices 120a–f may each be implemented with any suitable type of storage device, using any suitable technology, such as magnetic, optical, magneto-optical, or electrical. For example, suitable storage devices could include hard disk drives, optical disks or discs (for example, CD-RW, DVD-RW, or DVD+RW), floppy disks, magnetic data storage disks or diskettes, magnetic tape, digital optical tape, EPROMs, EEPROMs, RAM, Non-Volatile RAM, and flash memory. In one example, one or more storage devices could be implemented with a model 2105 Enterprise Storage Server, manufactured by International Business Machines Corporation.

The client computers 102a–e, meta-data servers 116a–c, meta-data storage devices 118a–b, and the data storage devices 120a–f may all be interconnected through a storage area network 122. As an example, the storage area network 122 may be implemented using an Ethernet or Fibre Channel network (or networks). The client computers 102a–e may, for example, use SCSI protocol to communicate with the data storage devices 120a–f. The client computers 102a–e may be able to access data directly from the data storage devices 120a–f.

II. Operation

In addition to the hardware embodiments described above, another aspect of the invention concerns a method for data journaling.

A. Signal-Bearing Media

In the context of FIG. 1, the method aspect of the invention may be implemented, for example, by having one or more of the client computers 102a–e, (and in some embodiments also the one or more of the meta-data servers 116a–c), execute a sequence of machine-readable instructions, which can also be referred to as code. These instructions may reside in various types of signal-bearing media. In this respect, one aspect of the present invention concerns a programmed product, comprising a signal-bearing medium or signal-bearing media tangibly embodying a program of machine-readable instructions executable by a digital processing apparatus to perform a method for data journaling.

Figure 2:
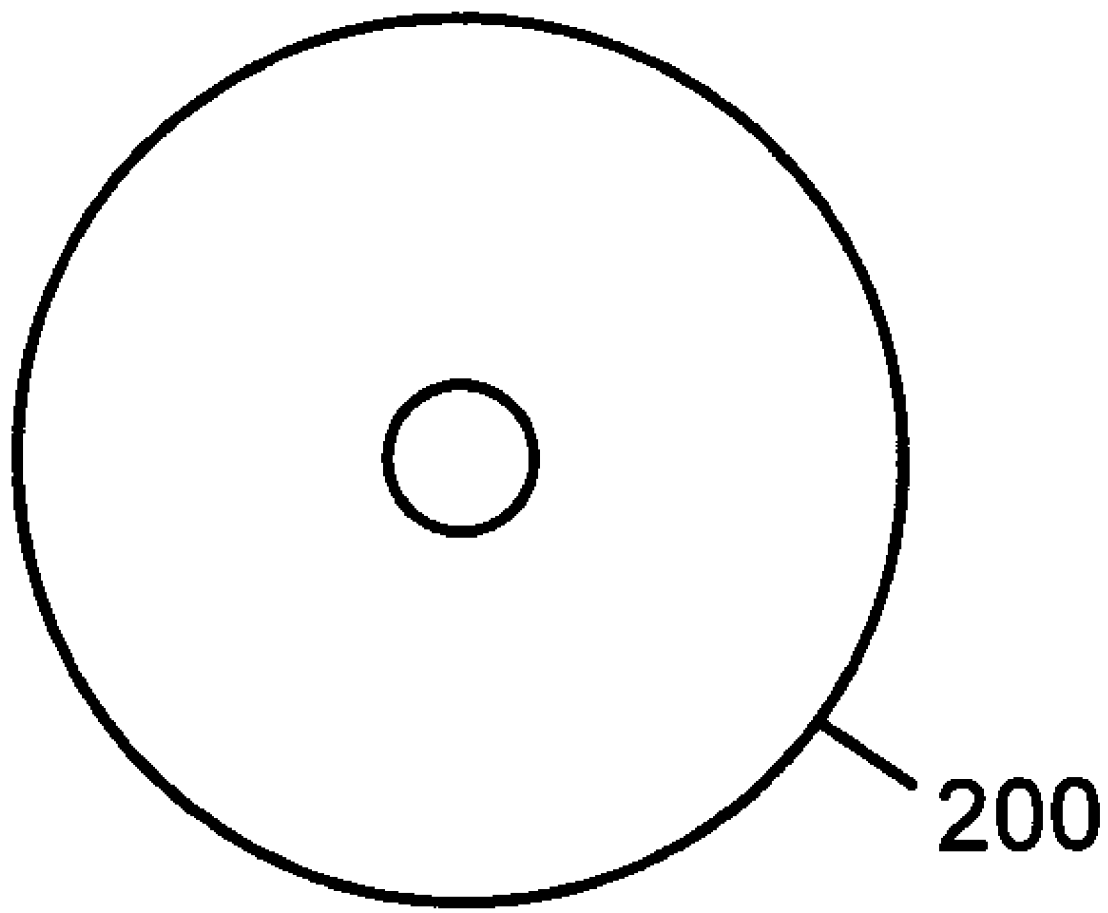
FIG. 2 is an example of a signal-bearing medium in accordance an example of the invention.

This signal-bearing medium may comprise, for example, storage 104 and/or non-volatile storage 106. Alternatively, the instructions may be embodied in a signal-bearing medium such as the optical data storage disc 200 shown in FIG. 2. The optical disc can be any type of signal bearing disc or disk, for example, a CD-ROM, CD-R, CD-RW, WORM, DVD-R, DVD+R, DVD-RW, or DVD+RW. Additionally, whether contained in the computer network 100 or elsewhere, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

B. Overall Sequence of Operation

Figure 3A:
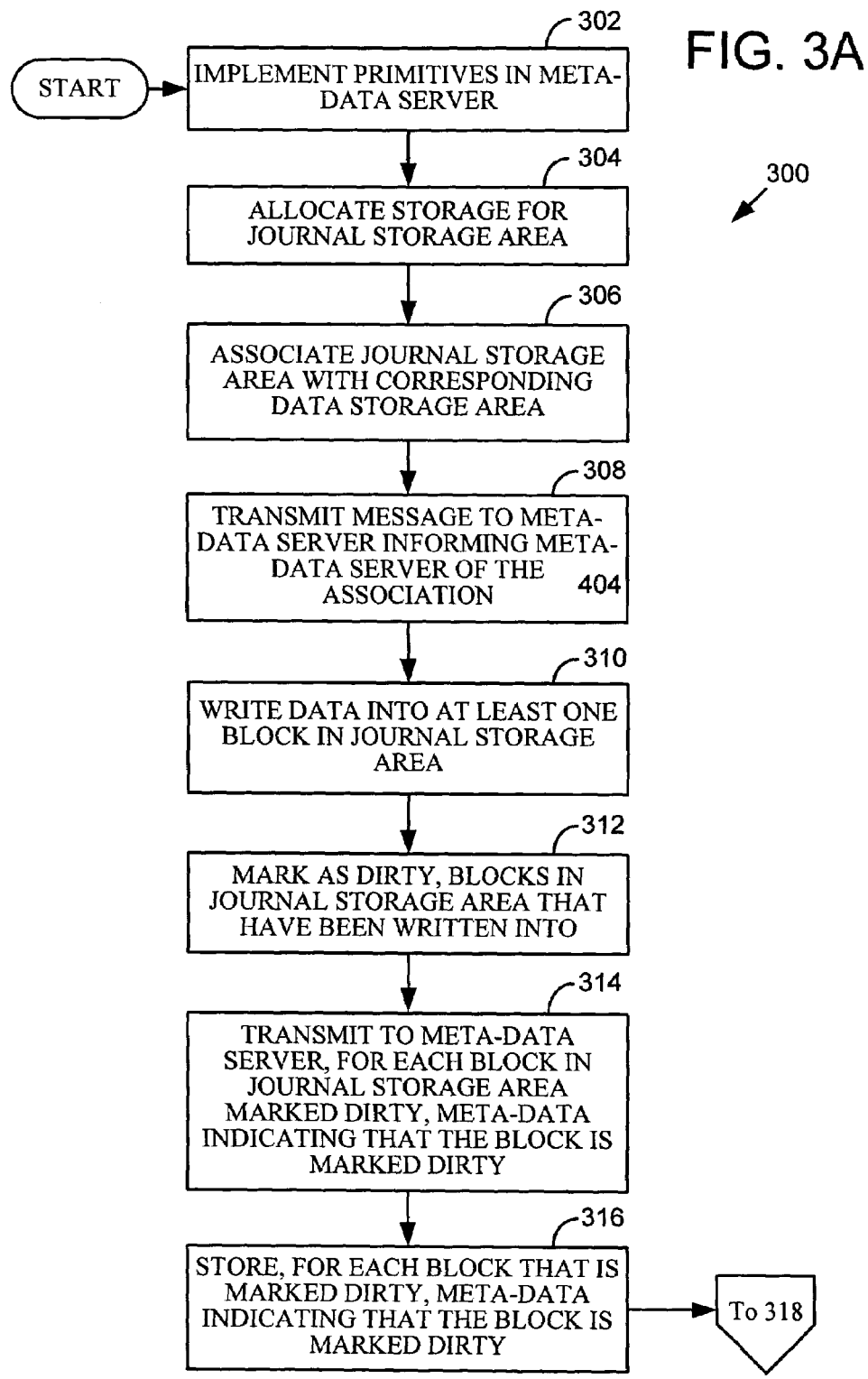
FIGS. 3A and 3B are a flowchart of an operational sequence for data journaling in accordance with an example of the invention.
Figure 3B:
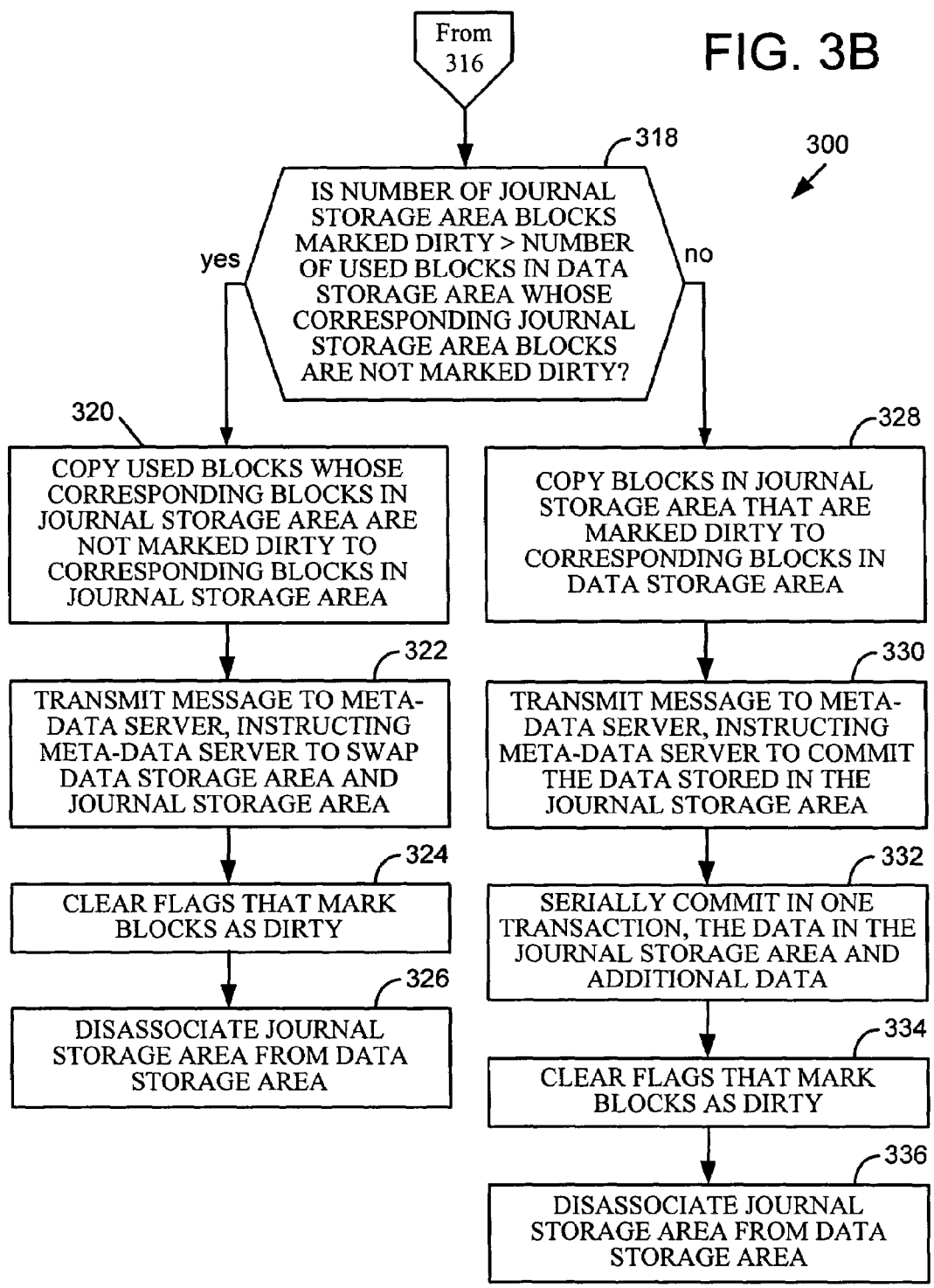

For ease of explanation, but without any intended limitation, the method aspect of the invention is described with reference to the computer network 100 described above and shown in FIG. 1. An example of the method aspect of the present invention is illustrated in FIGS. 3A and 3B, which show a sequence 300 for a method for data journaling. Referring to FIG. 3A, the sequence 300 may include, and begin with, operation 302 which comprises implementing primitives, which may also be called transaction messages, in the meta-data servers 116a–c. As an example, the primitives may include the following:

1. Allocate_Journal_Space—This primitive allocates a journal storage area to be used as a journal by a client 102a–e. In some examples the journal storage area may be an extent. An extent is a contiguous set of blocks of data storage. As an example, in Storage Tank, extents have a size of 4 KB to 1 MB and consist of a number of contiguous blocks that each have a size of 4 KB to 256 KB. In some examples, the clients could pre-allocate many journal storage areas (extents), with the number of journal storage areas being a function of the expected write rate and the expected data commit and flush rates.

2. Associate_Data_Journal—This primitive informs a meta-data server 116*a–c* of the association a client 102*a–e* has created between a data storage area (extent) and a journal storage area (extent).
3. Swap_Data_Journal—This primitive swaps the data storage area (extent) and the journal storage area (extent) and possibly clears journal extent flags. The journal storage area (extent) could be an implicit parameter that could be derived by a meta-data server 116*a–c* using the data storage area to journal storage area associations already established.
4. Commit_Data_Journal—This primitive commits the data in the journal storage area (extent) to the data storage area (extent). This is really a non-operation and the only purpose of this primitive is to allow a meta-data server 116*a–c* to update its transaction log and possibly clear flags in the journal storage area (extent).
5. Disassociate_Journal_Extent—This primitive disassociates a previously established association between a data storage area (extent) and a journal storage area (extent).
6. Harden_Extent_Flags—This primitive is used to propagate the dirty flags (along with other journal storage area meta-data) to the meta-data servers 116*a–c*.

The sequence 300 may also include operation 304, which may be performed by a client 102*a–e*, and which comprises allocating storage for the journal storage area. As an example, the storage space for the journal storage area could be a pre-allocated part of the same storage entity as the data storage area, or could be in a different storage entity. Generally, the journal storage area and the data storage area are symmetric, which means that from the perspective of the file system, conceptually there is no difference between the journal storage area and the data storage area.

The sequence 300 may additionally include operation 306, which may be performed by a client 102*a–e*, and which comprises associating the journal storage area with the corresponding data storage area. In some alternative examples the association may be established as the first step during a commit. The sequence 300 may also include operation 308, which comprises transmitting a message from a client 102*a–e* to one or more meta-data servers 116*a–c* informing the meta-data servers 116*a–c* of the association of the journal storage area and the corresponding data storage area.

Figure 4:
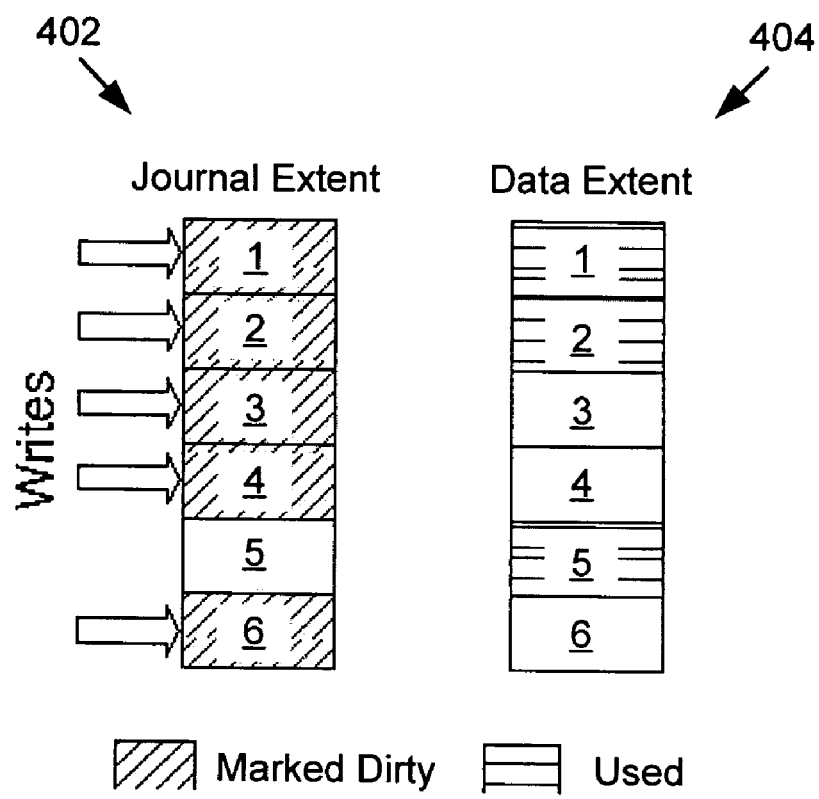
FIG. 4 is a block diagram of a journal extent and a data extent in accordance with an example of the invention.

Operation 310 comprises writing data into at least one block in a journal storage area. The data is written into an existing journal storage area if one has already been allocated for the particular data storage area, or into a new journal storage area, which may be created with the Allocate_Journal_Space primitive followed by the Associate-_Data_Journal primitive. FIG. 4 shows a journal storage area (extent) 402 and a corresponding data storage area (extent) 404, wherein data is written into blocks 1, 2, 3, 4, and 6 of the journal storage area (extent).

Referring again to FIG. 3A, in operation 312, each block in the journal storage area 402 that has been written into is marked as dirty. The operation of marking as dirty may comprise using meta-data flags to mark as dirty, blocks in the journal storage area 402 that have been written into. This information concerning which blocks have been written into is part of the journal data, and consequently, should be stored for persistence, for example, in a meta-data server 116*a–c* or in a local storage/NVRAM (non-volatile RAM). Storing these meta-data flags in a meta-data server 116*a–c* increases latency, but also facilitate more congruous file system recovery across the nodes of the distributed file system. Alternatively this meta-data could be written as part of data on a remote storage target such as the data storage devices 120*a–f*. In some examples, the updates to meta-data servers 116*a–c* could be performed only at the time of commit, and in this case the overhead would be a function of the commit frequency. Operations 310 and 312 are a writing portion of the sequence 300, and are followed by operations for committing, described below.

The sequence 300 may also include operation 314, which comprises transmitting to a meta-data server 116*a–c*, for each block in the journal storage area 402 that has been marked as dirty, meta-data indicating that the block has been marked as dirty (for example, the marked flags). This operation may be performed for each journal storage area in which blocks have been marked as dirty. The operation of transmitting meta-data indicating that a respective block has been marked as dirty may comprise transmitting a Harden-_Extent_Flags primitive to a meta-data server 116*a–c*. After this operation, complete redo-recovery of the transaction is possible.

The sequence 300 may also include operation 316, which comprises storing in a meta-data server 116*a–c*, for each block in the journal storage area 402 that has been marked as dirty, meta-data indicating that the block has been marked as dirty. Alternatively, the meta-data indicating that the block has been marked as dirty may be stored in a local storage/NVRAM 106, or may be written as part of data on a remote storage target (such as data storage devices 120*a–f*).

Referring to FIG. 3B, operation 318 comprises determining if the number of blocks in the journal storage area 402 that have been marked as dirty is greater than the number of blocks in a corresponding data storage area 404 that have been used and whose corresponding blocks in the journal storage area are not marked as dirty.

If in operation 318 it is determined that the number of blocks in the journal storage area 402 that have been marked as dirty is greater than the number of blocks in a corresponding data storage area 404 that have been used and whose corresponding blocks in the journal storage area 402 are not marked as dirty, then the sequence may also include one or more of operations 320, 322, 324, and 326, which are discussed below.

Figure 5:
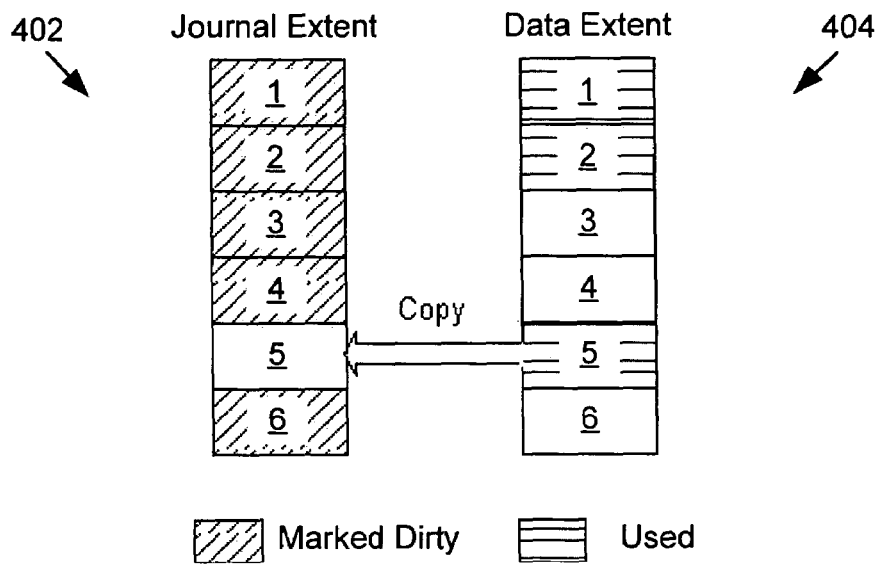
FIG. 5 is a block diagram of a journal extent and a data extent in accordance with an example of the invention.
Figure 6:
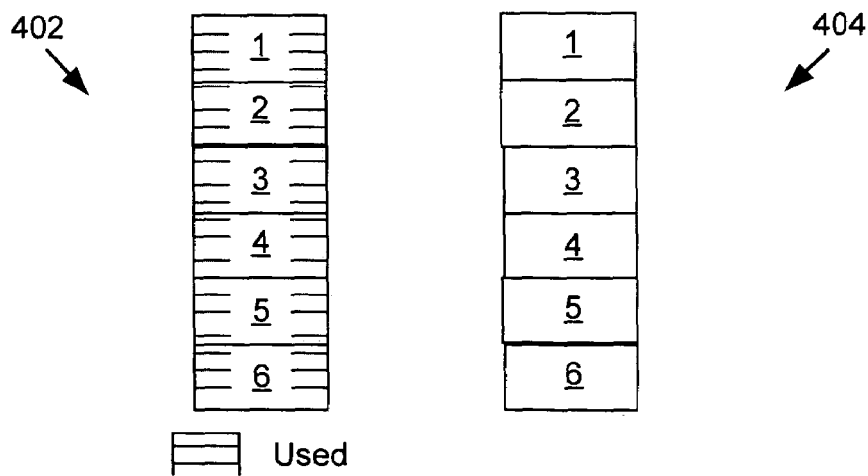
FIG. 6 is a block diagram of a journal extent and a data extent in accordance with an example of the invention.

Operation 320 comprises copying the used blocks in the data storage area 404 whose corresponding blocks in the journal storage area 402 are not marked as dirty, to the corresponding blocks in the journal storage area 402. This copying operation is shown in FIG. 5. Referring to FIG. 3B, operation 322 comprises transmitting to a meta-data server 116*a–c*, a message instructing the meta-data server 116*a–c* to swap the data storage area 404 and the journal storage area 402. This swapping operation is shown in FIG. 6. Operation 322 may include transmitting a Swap_Data_Journal primitive to the meta-data server 116*a–c*, and may also include updating a meta-data cache in a client 102*a–e* to reflect that the data storage area 402 and the journal storage area 404 have been swapped. The meta-data servers 116*a–c* may treat the meta-data change like any other meta-data change (for example, with regard to callbacks).

Referring again to FIG. 3B, operation 324 comprises clearing flags in the journal storage area 402 that mark blocks as dirty, and operation 326 comprises disassociating the journal storage area 402 from the corresponding data storage area 404, and may include using the Disassociate-_Journal_Extent primitive. The journal extent 402 may then be associated with another data extent.

If in operation 318 it is determined that the number of blocks in the journal storage area 402 that have been marked as dirty is not greater than the number of blocks in a corresponding data storage area 404 that have been used and whose corresponding blocks in the journal storage area 402 are not marked as dirty, then the sequence may also include one or more of operations 328, 330, 332, 334, and 336, which are discussed below.

Operation 328 comprises copying the blocks in the journal storage area 402 that have been marked as dirty to corresponding blocks in the data storage area 404. Operation 330 comprises transmitting to a meta-data server 116*a–c*, a message instructing the meta-data server 116*a–c* to commit the data that has been stored (logged) in the journal storage area 402. The operation of transmitting to the meta-data server 116*a–c*, a message instructing the meta-data server 116*a–c* to commit the data that has been stored in the journal storage area 402, may include transmitting a Commit_Data_Journal primitive to the meta-data server 116*a–c*. The clients 102*a–c* may deal with the meta-data changes normally. Also, the meta-data servers 116*a–c* may take care of journaling for transaction messages behind the scenes. Operation 332, which comprises serially committing, in one transaction, the data in the journal storage area 402 and additional data in a plurality of additional journal storage areas, may also be included. Commits may be at the granularity of extents, and as an example, extents could be defined as including one, or more, blocks. However, this has no impact on the timing or frequency of the commits, and is done mainly because blocks inside an extent need to be contiguous.

Operation 334 comprises clearing flags in the journal storage area 402 that mark blocks as dirty. At this point the commit may be considered to be complete. Operation 336 comprises disassociating the journal storage area 402 from the corresponding data storage area 404. The journal extent 402 may then be associated with another data extent.

Operations 314–336 are a commit portion of the sequence 300. Reads from other clients during the commit portion of the sequence 300 could result in inconsistent results. However, this is no different than the inconsistency that could occur during non-journaled write and read sharing, and hence should be dealt with in an implementation specific manner.

The invention is a methodology and technique by which data journaling is implemented with significantly reduced impact on write performance in comparison to other data journaling methods, particularly for sequential data accesses. Although the invention has been described as implemented in a Storage Tank environment, the invention could also be used with other types of file systems.

The fundamental unit of storage in most types of storage is a block (which is usually multiples of 512 bytes). Files are usually allocated at the granularity of blocks, and most filesystems try to allocate the blocks as close together as possible for any particular file, mainly to minimize disk seek time during sequential access. For example, "ext2" preallocates eight contiguous blocks and also attempts to keep all of the blocks for any particular file within the same block group. Storage Tank allocates extents, which each have a size of 4 K to 1 MB, and each extent consists of a number of contiguous blocks that each have a size of 4 K to 256 K.

Existing data journaling file systems, for example "ext3", write the data into a log area, and then write the data into the original data blocks only after the transaction (the file system operation) is committed. In some examples of the invention, instead of writing the data in the log and then in the original location, the data journal space is allocated in a symmetric manner (with respect to file space allocation), and instead of writing the data into the original location, the file meta-data is changed to include the journal data space (as far as possible), thereby obviating the need for a second write. This data journaling methodology advantageously makes use of the fact that blocks (or extents) allocated for and used in a file can be altered dynamically in most file systems.

With Storage Tank, data is handled by the clients 102*a–e*, and data journaling can be handled by the clients 102*a–e* with or without the knowledge of the meta-data servers 116*a–c*. In either case the journaling space should be allocated from the meta-data servers 116*a–c*. If the clients 102*a–e* implement data journaling without the meta-data servers' 116*a–c* knowledge, then the clients 102*a–e* may obtain the data journal space journal storage area) as a normal file space (which is recognized as a special file by the clients 102*a–e*). Alternatively, the clients 102*a–e* may allocate the data journal journal storage area) as a special file/space as recognized by the meta-data servers 116*a–c*. In this latter case, the clients 102*a–e* may use the functionality of the meta-data servers 116*a–c* to commit data, and further, file system recovery may be carried out by the meta-data servers 116*a–c* even in the absence of the clients 102*a–e*.

Performance and Tuning

For sequential writes beginning and ending on extent boundaries, data journaling in accordance with the invention has 0% overhead over non-journaled writes (discounting the meta-data overhead). As long as the commit points are reasonably placed, sequential writes will tend to have low overhead. For example, writes that are committed at 10 MB boundaries with 1 MB as extent size will have a write overhead of 0 MB to 1 MB, depending on the number of used blocks and size of (mis)alignment of the write boundaries and the boundaries of the extents. Hence the maximum overhead would be 10%, and the average would tend to be <5% for 1 MB extents. With 4K extents, the maximum overhead would be as low as 0.04%, with the average dropping to <0.02%.

Worst Case Performance: If the writes are relatively small or random in nature, and, the commit policy does not allow for much write-behind caching, then the overhead of data journaling could be as high as 100%. Although this is not better than other data journaling techniques, most of the non-cached random writes originate from applications that would be capable of providing themselves with caching and journaling mechanisms (for example, databases, which would not need data journaling at the file system level).

Performance could be improved in most cases by tuning the write-behind cache parameters and/or reducing the extent size. The performance may also be improved by serially committing a number of extents in one transaction. However, the meta-data server 116*a–c* should support the necessary transaction messages.

Recovery

This section explains how recovery of the filesystem (meta-data and data) may be performed after failure of a client 102*a–e*, storage target (such as data storage devices 120*a–f*), or a meta-data server 116*a–c*.

Client Failure: Before the commit operation (the commit portion of the sequence 300) is started for a particular extent, the meta-data server 116*a–c* may not have the journal data flags updated, and possibly also may not have the association between a data extent and a journal extent. Hence, at this point the client 102*a–e* is fully in charge of any and all recovery, which may be limited in nature. A client 102*a–e* could potentially have a local cache on persistent storage, such as NVRAM or a local disk, and if so, might be able to recover from a client failure. If a client 102a–e doesn't recover quickly enough, a meta-data server 116a–c might take over the resources allocated to the client, which could include journal extents and data locks. Filesystem consistency is not affected at this point.

When a client 102a–e starts the commit operation (the commit portion of the sequence 300), a meta-data server 116a–c will have knowledge about the association of the data extent and the journal extent, and will also have knowledge of the marked blocks in the journal extent. At this point, if the client 102a–e fails the meta-data server 116a–c could take control of the transaction and complete the transaction on behalf of the client 102a–e. This might involve the meta-data server 116a–c having to copy some part of the data extent to the journal extent or vice-versa. The decision regarding swapping the extents should be consistent across clients 102a–e and meta-data servers 116a–c.

Meta-Data Server Failure: Before the commit operation (the commit portion of the sequence 300) is started, the meta-data server 116a–c isn't responsible for journaling except for maintaining associations between data extents and journal extents. Accordingly, if the meta-data fails and recovers before the client 102a–e initiates the commit operation, no damage is done. If the meta-data server 116a–c fails in the middle of the commit operation (after the marked flags of the journal extent have been updated), then the client 102a–e has to wait for the meta-data server 116a–c to recover to commit the data. Even if the client 102a–e fails before the meta-data server 116a–c comes up, the server 116a–c will have enough information to recover and commit the transaction on its own without any assistance from the client 102a–e. Additional recovery capability could be provided by extending the lock recovery mechanism.

Storage Target Failure: If the storage target (for example, one or more of the data storage devices 120a–f) fails before commit, then the client 102a–e could possibly report the error and ask the meta-data server 116a–c to assign a different extent for its journal extent. This would require the client 102a–e to buffer write requests at the level of extents in its local cache so that if the target fails, the journal extent could be reassigned and the data could be written to the new journal extent. If the storage target fails after the commit operation is initiated and the failed target affects the data extent, then it has to be dealt with as a part of the filesystem storage going down. The client 102a–e could wait (for some time) for the storage target to come back alive and then resume its operation. If the storage target fails after the commit operation is initiated, and the failed target affects the journal extent, and if the client 102a–e (or server 116a–c) was in the process of writing data into the data extent from the journal extent, then it has to be dealt with as part of the filesystem storage going down. The client 102a–e (or server 116a–c) could wait for some time for the storage target to come back alive and then resume its operation. If the storage target fails after the commit operation is initiated, and the failed target affects the journal extent, and if the client 102a–e (or server 116a–c) was not in the process of writing data into the data extent from the journal extent, then the operation could be safely aborted without compromising the consistency of the filesystem.

Issues

Multiple Writes: The situation where a client 102a–e receives a write request for a particular region of the file while a previous write for the same region hasn't been committed should be addressed. Clients 102a–e should not allow operations across commit boundaries to be coalesced. One way to deal with this would be for the client 102a–e not to allow the second write before the first write commits. The client 102a–e might also choose to implement use of a different journal extent in order to accommodate multiple writes (possibly using Copy On Write—COW). The ultimate choice is implementation specific.

Snapsot: Snapshot blocks could be handled during the commit operation of the client 102a–e. The client 102a–e could determine which blocks have been changed from the pre-commit extent to the expected post-commit extent and take care of them. Alternatively, the client 102a–e could keep the snapshot image updated while writing to the journal extent.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A signal bearing medium tangibly embodying a program of machine-readable instructions executable by a digital processing apparatus to perform a method for data journaling, the method comprising the following operations:

writing data into at least one block in a journal storage area;

marking as dirty, each block in the journal storage area that has been written into; and determining if the number of blocks in the journal storage area that have been marked as dirty is greater than the number of blocks in a corresponding data storage area that have been used and whose corresponding blocks in the journal storage area are not marked as dirty, and if so:

copying the used blocks in the data storage area whose corresponding blocks in the journal storage area are not marked as dirty, to the corresponding blocks in the journal storage area; and transmitting to a meta-data server, a message instructing the meta-data server to swap the data storage area and the journal storage area;

and if not:

copying the blocks in the journal storage area that have been marked as dirty to corresponding blocks in the data storage area; and transmitting to the meta-data server, a message instructing the meta-data server to commit the data that has been stored in the journal storage area.

2. The signal bearing medium of claim 1, wherein the operations further comprise, transmitting to the meta-data server, for each block in the journal storage area that has been marked as dirty, meta-data indicating that the block has been marked as dirty.

3. The signal bearing medium of claim 2, wherein:

the operation of marking as dirty comprises using meta-data flags to mark blocks in the journal storage area that have been written into as dirty; and the operation of transmitting meta-data indicating that the respective block has been marked as dirty comprises transmitting a Harden_Extent_Flags primitive to the meta-data server.

4. The signal bearing medium of claim 1, wherein the operations further comprise, allocating storage for the journal storage area.

5. The signal bearing medium of claim 1, wherein the operations further comprise, associating the journal storage area with the corresponding data storage area.

6. The signal bearing medium of claim 1, wherein the operations further comprise, transmitting a message to the meta-data server informing the meta-data server of the association of the journal storage area and the corresponding data storage area.

7. The signal bearing medium of claim 1, wherein the operations further comprise:
   clearing flags in the journal storage area that mark blocks as dirty; and disassociating the journal storage area from the corresponding data storage area.

8. The signal bearing medium of claim 1, wherein the operations further comprise, storing in the meta-data server, for each block in the journal storage area that has been marked as dirty, meta-data indicating that the block has been marked as dirty.

9. The signal bearing medium of claim 1, wherein the operations further comprise, storing in a local storage/NVRAM, for each block in the journal storage area that has been marked as dirty, meta-data indicating that the block has been marked as dirty.

10. The signal bearing medium of claim 1, wherein the operations further comprise, writing as part of data on a remote storage target, for each block in the journal storage area that has been marked as dirty, meta-data indicating that the block has been marked as dirty.

11. The signal bearing medium of claim 1:
   wherein the operation of transmitting to a meta-data server, a message instructing the meta-data server to swap the data storage area and the journal storage area, comprises transmitting a Swap_Data_Journal primitive to the meta-data server; and
   wherein the operations further comprise updating a meta-data cache in a client to reflect that the data storage area and the journal storage area have been swapped.

12. The signal bearing medium of claim 1, wherein the operation of transmitting to the meta-data server, a message instructing the meta-data server to commit the data that has been stored in the journal storage area, comprises transmitting a Commit_Data_Journal primitive to the meta-data server.

13. The signal bearing medium of claim 1, wherein if in the determining operation it is determined that the number of blocks in the journal storage area that have been marked as dirty is not greater than the number of blocks in the corresponding data storage area that have been used and whose corresponding blocks in the journal storage area are not marked as dirty, then the operations further comprise, serially committing in one transaction, the data in the journal storage area and additional data in a plurality of additional journal storage areas.

14. The signal bearing medium of claim 1, wherein the operations further comprise, implementing the following primitives in the meta-data server:
   Allocate_Journal_Space;
   Associate_Data_Journal;
   Swap_Data_Journal;
   Commit_Data_Journal;
   Disassociate_Journal_Extent; and
   Harden_Extent_Flags.

15. A computing system, comprising:
   a memory; and
   a processing device coupled to the memory, wherein the processing device is programmed to perform operations for data journaling, the operations comprising:
   writing data into at least one block in a journal storage area;
   marking as dirty, each block in the journal storage area that has been written into; and
   determining if the number of blocks in the journal storage area that have been marked as dirty is greater than the number of blocks in a corresponding data storage area that have been used and whose corresponding blocks in the journal storage area are not marked as dirty,
   and if so:
   copying the used blocks in the data storage area whose corresponding blocks in the journal storage area are not marked as dirty, to the corresponding blocks in the journal storage area; and
   transmitting to a meta-data server, a message instructing the meta-data server to swap the data storage area and the journal storage area;
   and if not:
   copying the blocks in the journal storage area that have been marked as dirty to corresponding blocks in the data storage area; and
   transmitting to the meta-data server, a message instructing the meta-data server to commit the data that has been stored in the journal storage area.

16. The computing system of claim 15, wherein the operations further comprise:
   associating the journal storage area with the corresponding data storage area;
   transmitting a message to the meta-data server informing the meta-data server of the association of the journal storage area and the corresponding data storage area; and
   transmitting to the meta-data server, for each block in the journal storage area that has been marked as dirty, meta-data indicating that the block has been marked as dirty.

17. The computing system of claim 15:
   further comprising the meta-data server, wherein the meta-data server is coupled to the processing device; and
   wherein the operations further comprise storing in the meta-data server, for each block in the journal storage area that has been marked as dirty, meta-data indicating that the block has been marked as dirty.

18. The computing system of claim 15:
   further comprising a local storage/NVRAM coupled to the processing device; and
   wherein the operations further comprise storing in the local storage/NVRAM, for each block in the journal storage area that has been marked as dirty, meta-data indicating that the block has been marked as dirty.

19. The computing system of claim 15:
   further comprising a remote storage target coupled to the processing device, and
   wherein the operations further comprise writing as part of data on the remote storage target, for each block in the journal storage area that has been marked as dirty, meta-data indicating that the block has been marked as dirty.

20. A computing system, comprising:
   means for writing data into at least one block in a journal storage area;

means for marking as dirty, each block in the journal storage area that has been written into;

means for transmitting to a meta-data server, for each block in the journal storage area that has been marked as dirty, meta-data indicating that the block has been marked as dirty;

means for determining if the number of blocks in the journal storage area that have been marked as dirty is greater than the number of blocks in a corresponding data storage area that have been used and whose corresponding blocks in the journal storage area are not marked as dirty;

means for copying the used blocks in the data storage area whose corresponding blocks in the journal storage area are not marked as dirty, to the corresponding blocks in the journal storage area;

means for transmitting to the meta-data server, a message instructing the meta-data server to swap the data storage area and the journal storage area;

means for copying the blocks in the journal storage area that have been marked as dirty to corresponding blocks in the data storage area; and means for transmitting to the meta-data server, a message instructing the meta-data server to commit the data that has been stored in the journal storage area.

21. A method for data journaling, comprising the following operations:

writing data into at least one block in a journal storage area;

marking as dirty, each block in the journal storage area that has been written into;

transmitting to a meta-data server, for each block in the journal storage area that has been marked as dirty, meta-data indicating that the block has been marked as dirty; and determining if the number of blocks in the journal storage area that have been marked as dirty is greater than the number of blocks in a corresponding data storage area that have been used and whose corresponding blocks in the journal storage area are not marked as dirty, and if so:

copying the used blocks in the data storage area whose corresponding blocks in the journal storage area are not marked as dirty, to the corresponding blocks in the journal storage area; and transmitting to the meta-data server, a message instructing the meta-data server to swap the data storage area and the journal storage area;

and if not:

copying the blocks in the journal storage area that have been marked as dirty to corresponding blocks in the data storage area; and transmitting to the meta-data server, a message instructing the meta-data server to commit the data that has been stored in the journal storage area.

22. The method of claim 21, further comprising associating the journal storage area with the corresponding data storage area.

23. The method of claim 22, further comprising, allocating storage for the journal storage area.

* * * * *